US012807058B2

(12) United States Patent
Harriton et al.

(10) Patent No.: US 12,807,058 B2
(45) Date of Patent: Nov. 24, 2026

(54) SHELTER STRUCTURE WITH CABOVER PORTION

(71) Applicant: TH Camper Company, LLC, Sparks, NV (US)

(72) Inventors: David Harriton, Missoula, MT (US); Matthew James Linder, Sparks, NV (US)

(73) Assignee: TH Camper Company, LLC, Sparks, NV (US)

( * ) Notice: Subject to any disclaimer, the term of this patent is extended or adjusted under 35 U.S.C. 154(b) by 303 days.

(21) Appl. No.: 18/755,398

(22) Filed: Jun. 26, 2024

(65) Prior Publication Data

US 2025/0001924 A1 Jan. 2, 2025

Related U.S. Application Data

(60) Provisional application No. 63/523,578, filed on Jun. 27, 2023.

(51) Int. Cl.
*B60P 3/32* (2006.01)
*B62D 35/00* (2006.01)

(52) U.S. Cl.
CPC .............. *B60P 3/32* (2013.01); *B62D 35/005* (2013.01)

(58) Field of Classification Search
CPC ................................. B60P 3/32; B62D 35/005
See application file for complete search history.

(56) References Cited

U.S. PATENT DOCUMENTS 3,325,205 A * 6/1967 Girski ........................ B60P 3/36 296/165
3,767,252 A * 10/1973 Hathaway, Jr. ........... B60P 3/32 296/99.1
3,797,879 A * 3/1974 Edwards .............. B62D 35/001 105/1.1
3,844,603 A * 10/1974 Bjork ......................... B60P 3/32 52/393
4,025,102 A * 5/1977 Hiles .......................... B60P 3/34 296/167

(Continued)

OTHER PUBLICATIONS

White, Gordon; 4 Camper Air Dams and Wind Deflectors; Dec. 2, 2021; https://www.truckcampermagazine.com/camper-mods/projects/4-camper-air-dams-and-wind-deflectors/ (Year: 2021).*

*Primary Examiner* — Taras P Bemko
(74) *Attorney, Agent, or Firm* — Varnum LLP

(57) ABSTRACT

A shelter structure having improved aerodynamics is provided. The shelter structure comprises a body having a first portion and a second portion, wherein the second portion is a cabover portion that extends from the first portion over and above the vehicle propulsion system and cockpit. The cabover portion may comprise at least a contact surface and two opposing lateral sides. At least one airfoil may be strategically positioned proximate the abutment of the contact surface and one of the lateral sides and pulls air away from the contact surface and redirects such air along the respective lateral sides in a non-turbulent manner, such that at least one airfoil reduces a high air pressure zone that may form on the contact surface proximate the respective lateral side during forward travel of the associated vehicle at sufficient speed, which thereby reduces the aerodynamic drag.

19 Claims, 11 Drawing Sheets

(56) References Cited

U.S. PATENT DOCUMENTS

| | | | | | |
|---|---|---|---|---|---|
| 4,106,806 | A * | 8/1978 | Haddon | B60P 3/32 | 296/156 |
| 4,890,879 | A * | 1/1990 | Hurlock | B62D 35/002 | 296/156 |
| 5,180,205 | A * | 1/1993 | Shoop | B62D 35/002 | 296/168 |
| 11,512,492 | B1 * | 11/2022 | Cook | E04F 10/005 | |
| 2008/0211259 | A1 * | 9/2008 | Nadeau | B60P 3/34 | 296/173 |
| 2024/0239423 | A1 * | 7/2024 | Bender | B62D 35/005 | |

* cited by examiner

SHELTER STRUCTURE WITH CABOVER PORTION

CROSS REFERENCE TO RELATED APPLICATIONS

This application claims the benefit of U.S. Provisional Application No. 63/523,578, filed Jun. 27, 2023, which is hereby incorporated by reference in its entirety.

TECHNICAL FIELD

The present specification generally relates to shelter structures or campers and, more specifically, to a cab over shelter structure or camper unit with exterior surface features for the improvement of aerodynamics during overland travel.

BACKGROUND

Cabover trucks are essentially a style of heavy-duty truck without a hood or a very short length of hood. In such arrangements, the truck cab sits on top of the engine and steering axle, which is beneficial in reducing length of the overall vehicle. Cabover campers and cabover motorcoaches are moveable shelter structures or recreational shelters. A cabover motorcoach may be a unitary motorcoach with a cabover design. A cabover camper may be built on or easily loaded into the cargo area of a mid-size or full-size pick-up truck. Such cabover designs reduce the towing length of a traditional bumper pull travel trailer or recreational vehicle (RV), while also producing better fuel economy. Such cabover designs are also versatile in that such a construction may be adapted to a variety of vehicular styles.

However, the cabover design, in the case of heavy-duty trucks and recreational vehicle designs, while decreasing the length of the overall vehicle, tend to increase the height of the vehicle due to the positioning of the cabover portion. As such, this increased height in some cases the increases the aerodynamic drag, decreases fuel economy, and decreases maneuverability of the vehicle. As such, there is a need, particularly in overland or offroad vehicles, for a shelter structure or camper having a cabover design with increased aerodynamic properties beneficial to overland travel.

SUMMARY

A shelter structure is provided. The shelter structure may be configured to be coupled to a vehicle propulsion system comprising a vehicle cockpit. The shelter structure may be formed as a cabover unit, such that the shelter structure comprises a body having a cabover portion. As such, the cabover portion is defined by a contact surface, two opposing lateral sides, and a bottom section that contains a bottom edge.

The shelter structure may further comprise at least one airfoil disposed upon the body thereof at the cabover portion. More particularly, cabover portion of the shelter structure body may comprise at least one airfoil disposed upon the contact surface such that the airfoil may result improved aerodynamics during forward travel of the associated vehicle at sufficient speed.

The at least one airfoil may have a leading edge, a trailing edge, and an airfoil intermediate section. The leading edge may be advantageously disposed along the contact surface at a positive angle of attack at or near one of the lateral sides. The trailing edge may be advantageously disposed along the respective lateral side downstream in the airflow path from the leading edge. The airfoil intermediate section may further define an airfoil exterior and an airfoil interior. The airfoil interior is disposed opposite the airfoil exterior and is radially spaced apart from the contact surface by an airflow path width W.

The airfoil is configured to pull air away from the contact surface of the cabover portion and redirect the airflow path from the portion of the contact surface substantially orthogonal to the direction of travel for the vehicle along the respective lateral sides of the body in a non-linear direction. More particularly, the airfoil leading edge splits the airflow as it contacts the respective leading edge, such that airflow along the exterior of the respective airfoil moves at a higher velocity than the airflow along the interior and through the airflow path width W, which thereby reduces the pressure on the exterior of the respective airfoil, i.e., reduces the aerodynamic drag at the position of the contact surface in which the airfoil is disposed, which results in improved vehicle performance, drivability, and fuel economy.

BRIEF DESCRIPTION OF THE DRAWINGS

The embodiments set forth in the drawings are illustrative and exemplary in nature and not intended to limit the subject matter. The following detailed description of the illustrative embodiments can be understood when read in conjunction with the following drawings, where like structure is indicated with like reference numerals and in which.

DETAILED DESCRIPTION

Figure 1:
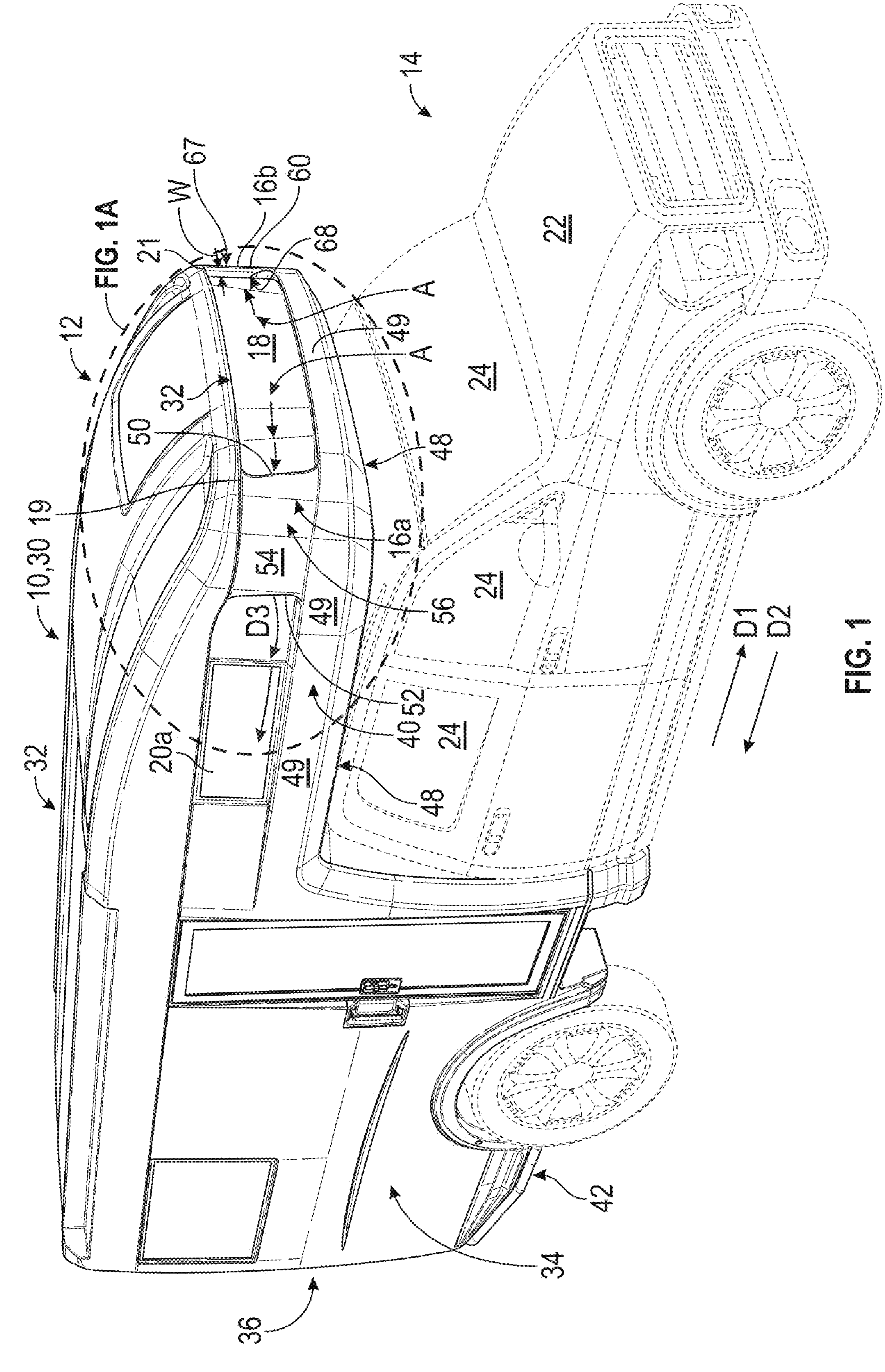
FIG. 1 depicts a schematic front perspective view of the shelter structure having a cabover portion, built on or disposed upon a full-size pick-up truck.
Figure 1A:
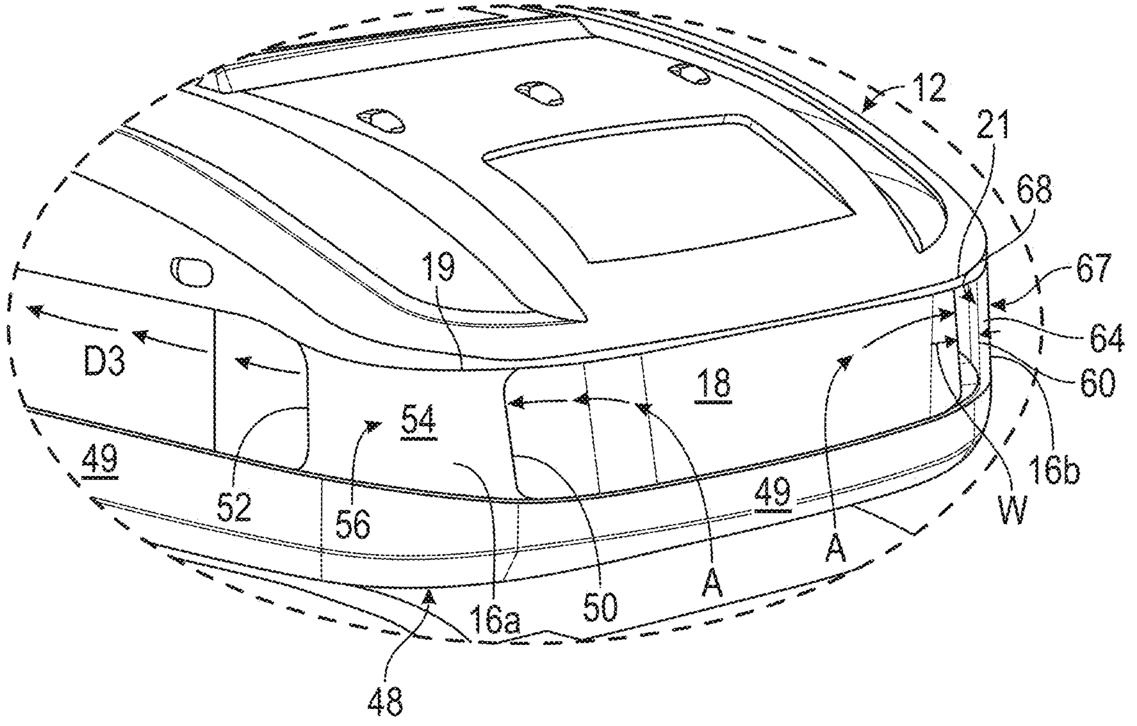
FIG. 1A depicts an enlarged portion of the front perspective view of the shelter structure having a cabover portion, built on or disposed upon a full-size pick-up truck shown in FIG. 1 with emphasis on the airfoil disposed on the contact surface of the cabover portion of the shelter structure body.
Figure 2:
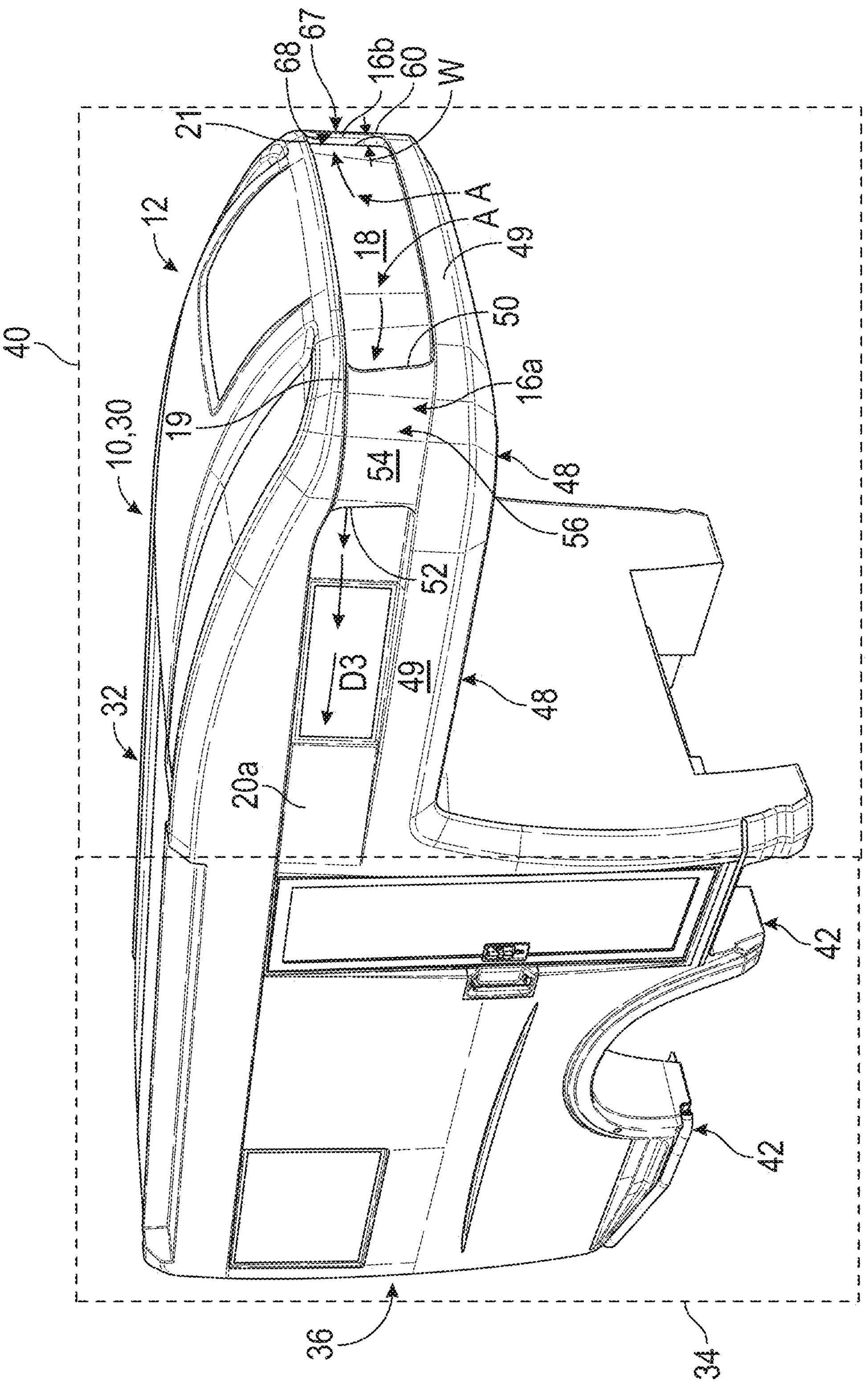
FIG. 2 depicts a schematic front perspective view of the shelter structure having a cabover portion.
Figure 3:
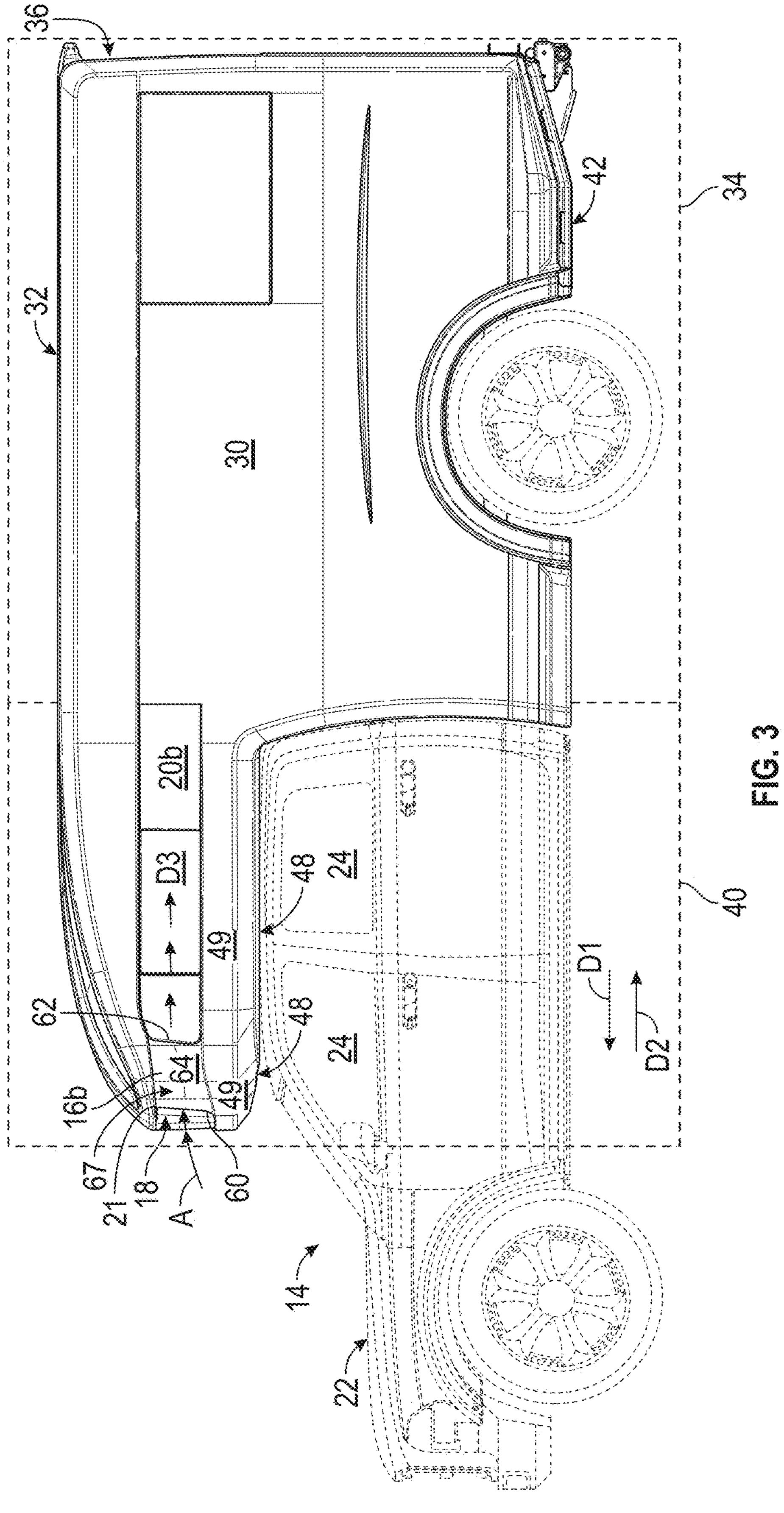
FIG. 3 depicts a first schematic side view of the shelter structure having a cabover portion built on or disposed upon a full-size pick-up truck.
Figure 4:
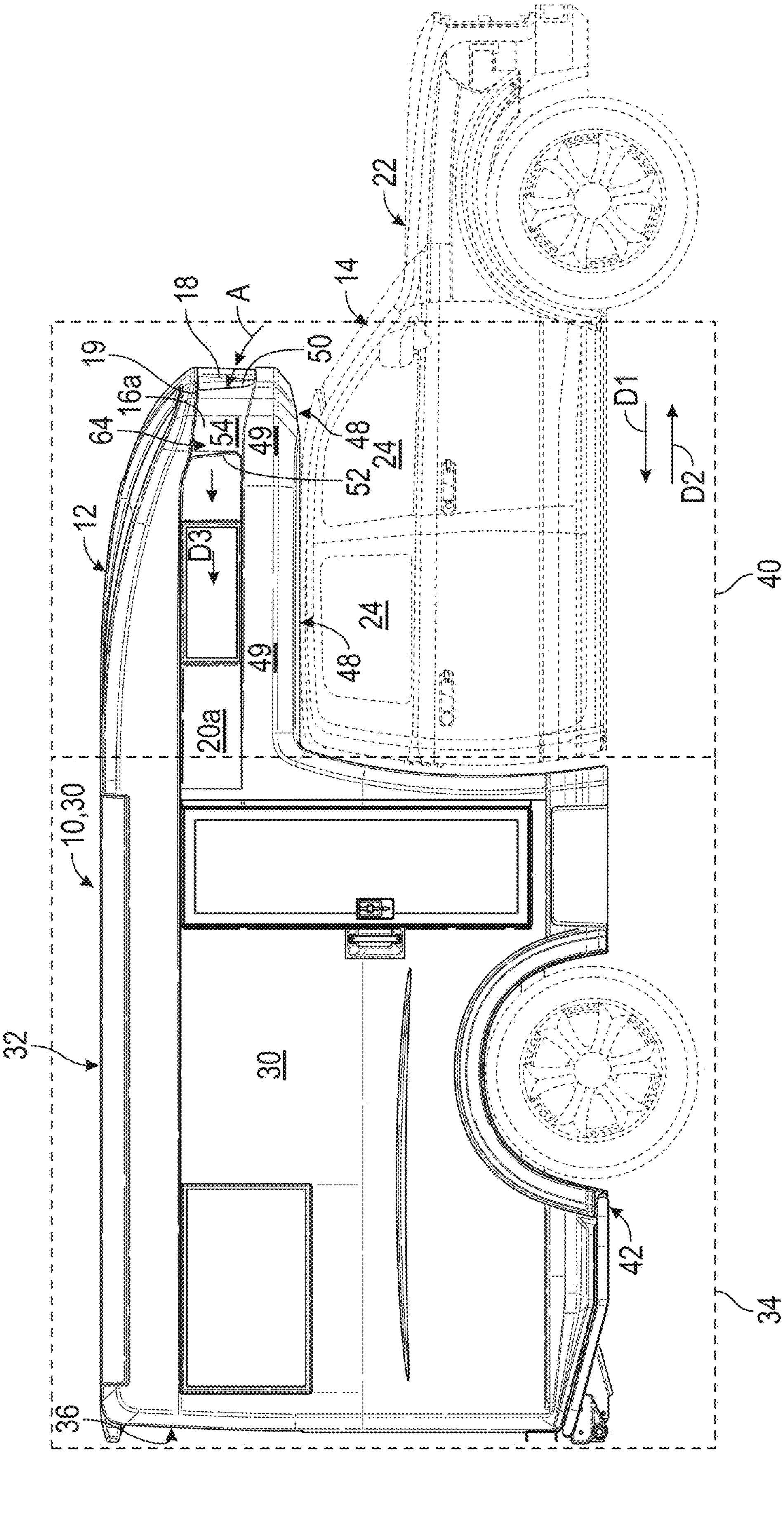
FIG. 4 depicts a second schematic side view of the shelter structure having a cabover portion built on or disposed upon a full-size pick-up truck.
Figure 5:
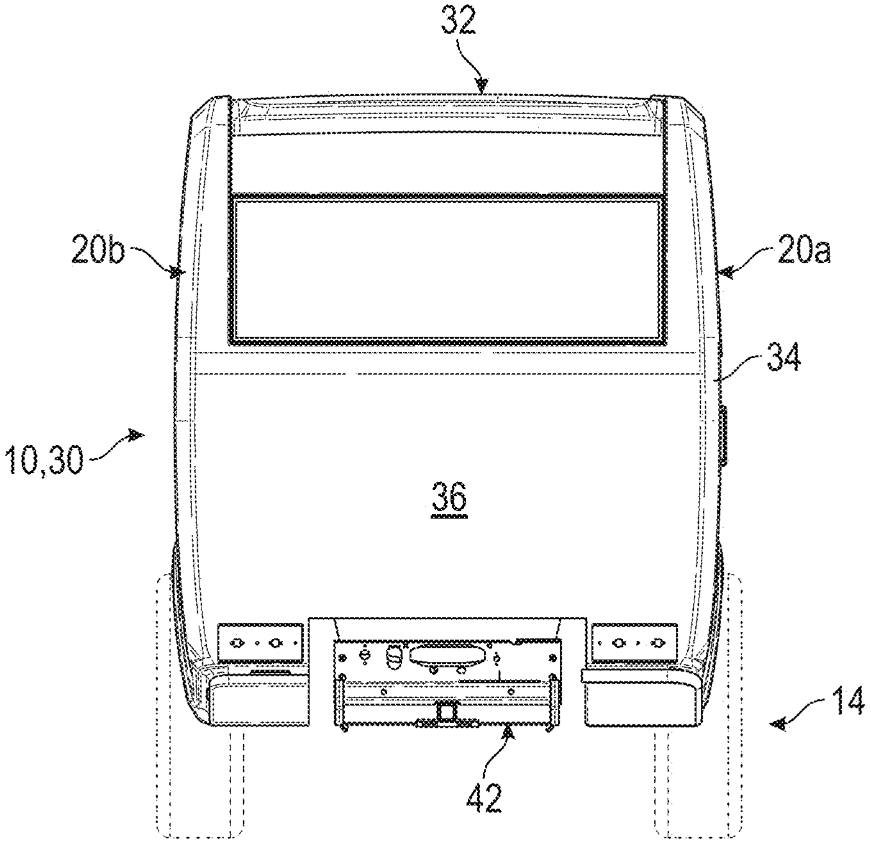
FIG. 5 depicts a schematic rear view of the shelter structure having a cabover portion built on or disposed upon a full-size pick-up truck.
Figure 6:
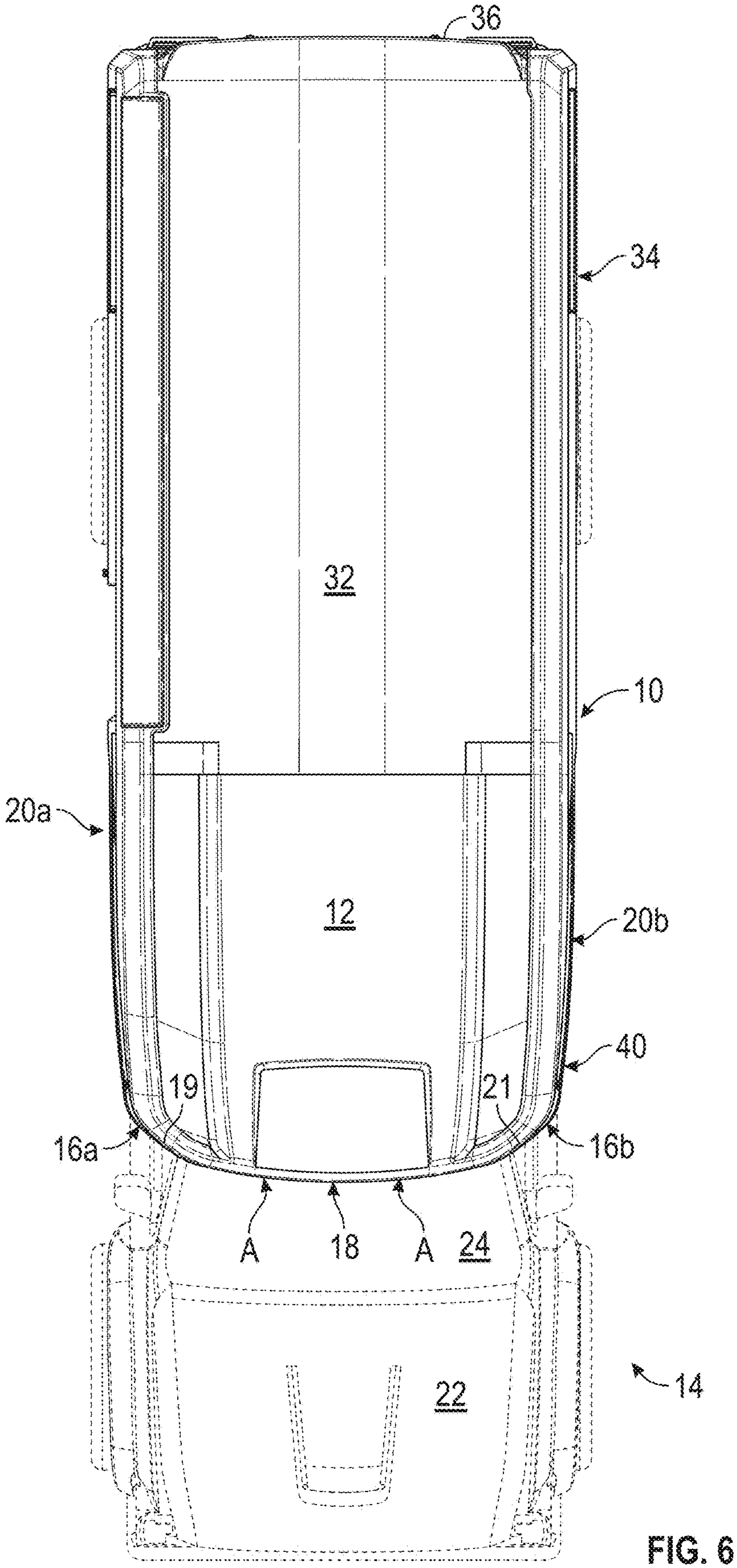
FIG. 6 depicts a schematic top view of the shelter structure having a cabover portion built on or disposed upon a full-size pick-up truck.
Figure 7:
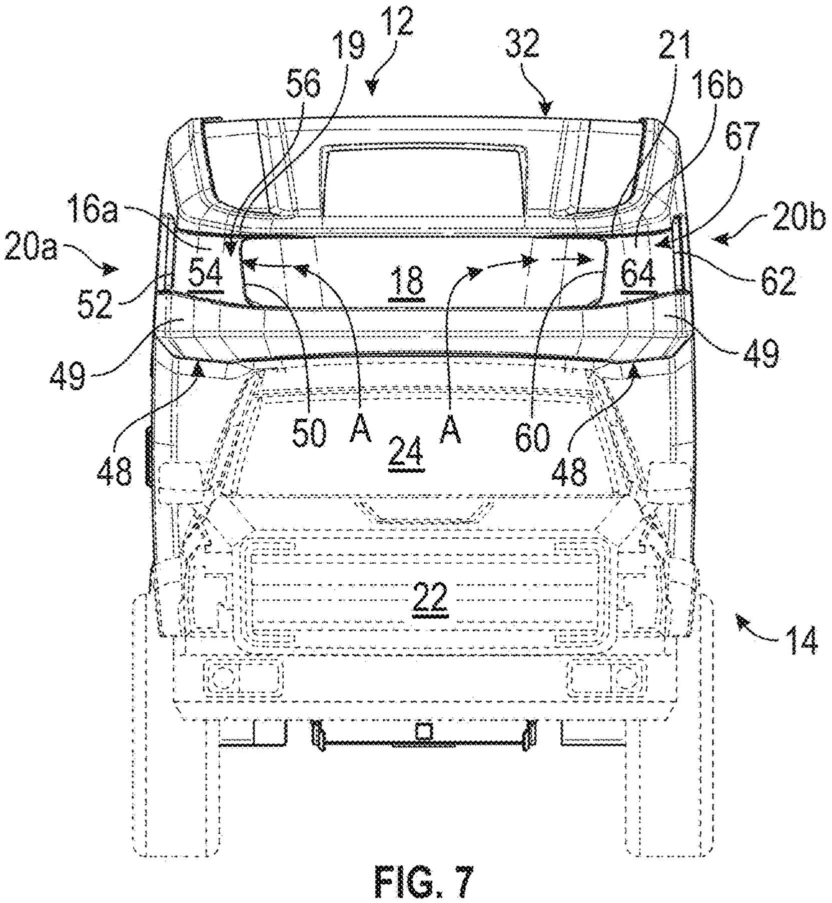
FIG. 7 depicts a schematic front view of the shelter structure having a cabover portion built on or disposed upon a full-size pick-up truck.
Figure 8:
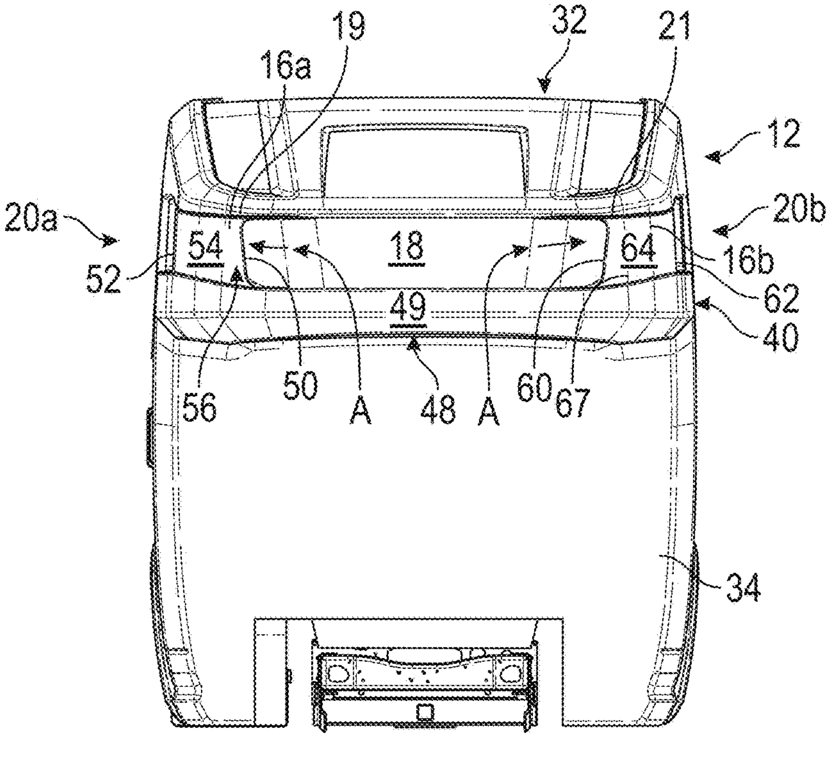
FIG. 8 depicts a schematic front view of the shelter structure having a cabover portion.
Figure 9:
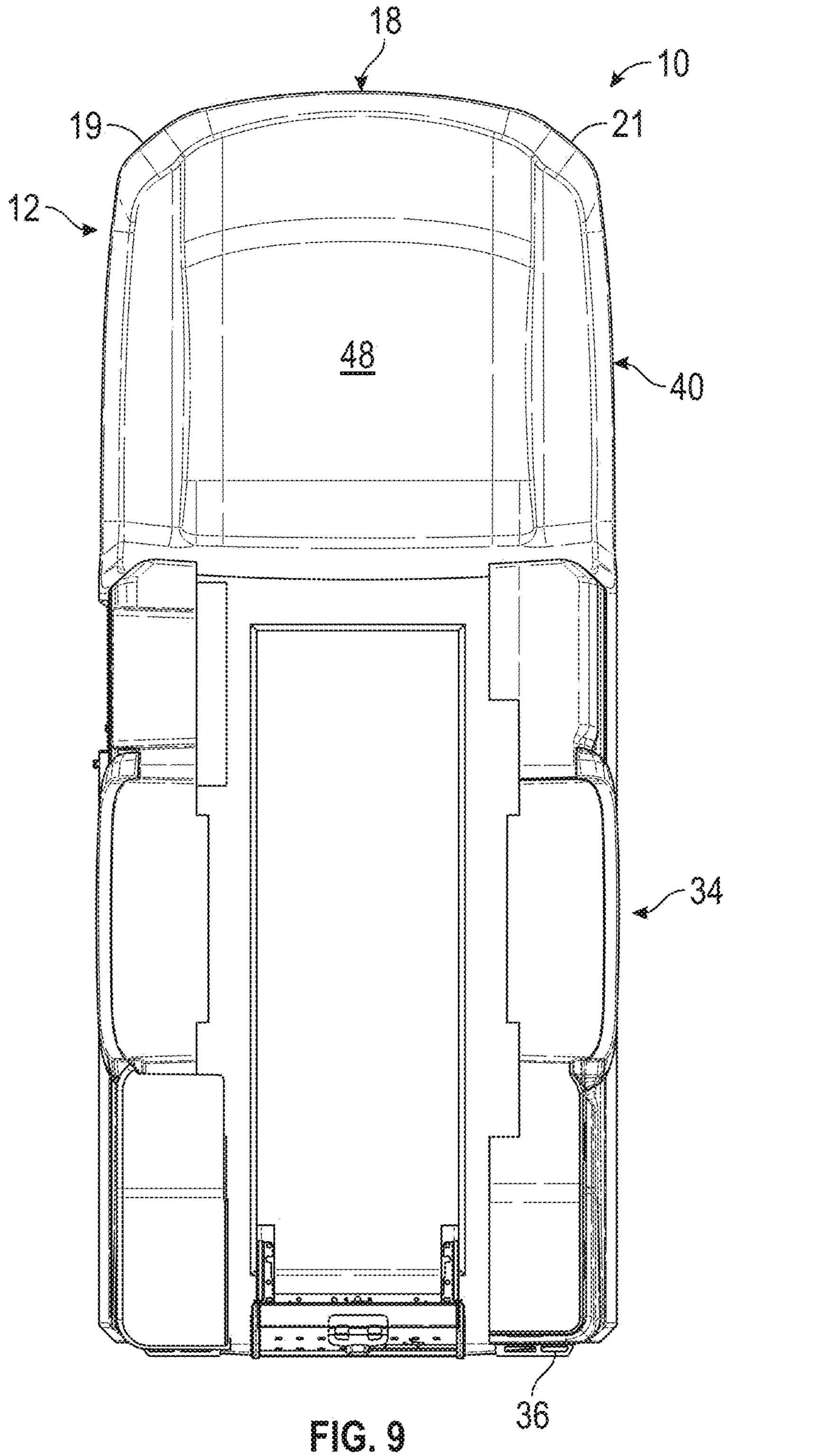
FIG. 9 depicts a schematic bottom view of the shelter structure having a cabover portion.

While the present disclosure may be described with respect to specific applications or industries, those skilled in the art will recognize the broader applicability of the disclosure.

The terms "a", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

For consistency and convenience, directional adjectives are employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims. Any numerical designations, such as "first" or "second" are illustrative only and are not intended to limit the scope of the disclosure in any way.

The term "longitudinal", as used throughout this detailed description and in the claims, refers to a direction extending a length of a component. The term "forward" or "anterior" is used to refer to the general direction from a tailgate or tailpipe of a vehicle to a front bumper or hood of a vehicle, and the term "rearward" or "posterior" is used to refer to the opposite direction, i.e., the direction from the front bumper or hood of a vehicle toward the tailgate or tailpipe of a vehicle. In some cases, a component may be identified with a longitudinal axis as well as a forward and rearward longitudinal direction along that axis. The longitudinal direction or axis may also be referred to as an anterior-posterior direction or axis.

The term "transverse", as used throughout this detailed description and in the claims, refers to a direction extending a width of a component. For example, a transverse direction of a vehicle extends between the driver's side of the vehicle and the passenger's side of the vehicle, for example between driver's side mirror to passenger's side mirror. The transverse direction or axis may also be referred to as a lateral direction or axis or a mediolateral direction or axis.

The term "vertical", as used throughout this detailed description and in the claims, refers to a direction generally perpendicular to both the lateral and longitudinal directions. The term "upward" or "upwards" refers to the vertical direction pointing towards a top of the component. The term "downward" or "downwards" refers to the vertical direction pointing opposite the upwards direction, toward the bottom of a component. The terms proximal and distal may be understood to provide generally opposing terms to describe relative spatial positions.

The following discussion and accompanying figures disclose embodiments of the shelter structure 10 having a cabover portion 12 of the present invention. Traditional cabover designs, for heavy-duty trucks, campers, motorcoaches, or other recreational vehicles tend to decrease the length of the overall vehicle 14, but in turn, tend to increase the height of the vehicle 14 due to the positioning of the cabover portion 12. Moreover, recreational vehicles (RV) generally, particularly for use in off-road and expedition environments, are inherently large. As such, the increased height of a cabover portion 12 of the shelter structure 10, added to already large off-road and expedition vehicle applications can increase aerodynamic drag, decrease fuel economy, a decrease maneuverability of the vehicle 14. As such, there is a need for a shelter structure 10 having a cabover portion 12 with increased aerodynamic properties particularly in offroad and expedition vehicles 14.

In a general sense, the present disclosure provides a shelter structure 10 having a cabover portion 12 with improved aerodynamics. More particularly, the present disclosure provides a shelter structure 10 having a cabover portion 12 with at least one strategically placed airfoil 16*a*, 16*b* positioned along a contact surface 18 of the cabover portion 12. The at least one airfoil 16*a*, 16*b* is disposed in and designed to reduce the air pressure and aerodynamic drag of the cabover portion 12 in high air pressure zones that may form on the contact surface 18 of the cabover portion 12 during forward travel of the associated vehicle 14 at sufficient speed. The at least one airfoil 16*a*, 16*b* pulls air away from the contact surface 18 of the cabover portion 12 and redirects such air that collects at the contact surface 18 along the respective lateral sides 20*a*, 20*b* of the shelter structure 10, which thereby reduces the aerodynamic drag and results in improved vehicle 14 performance, drivability, and fuel economy.

Figure 10:
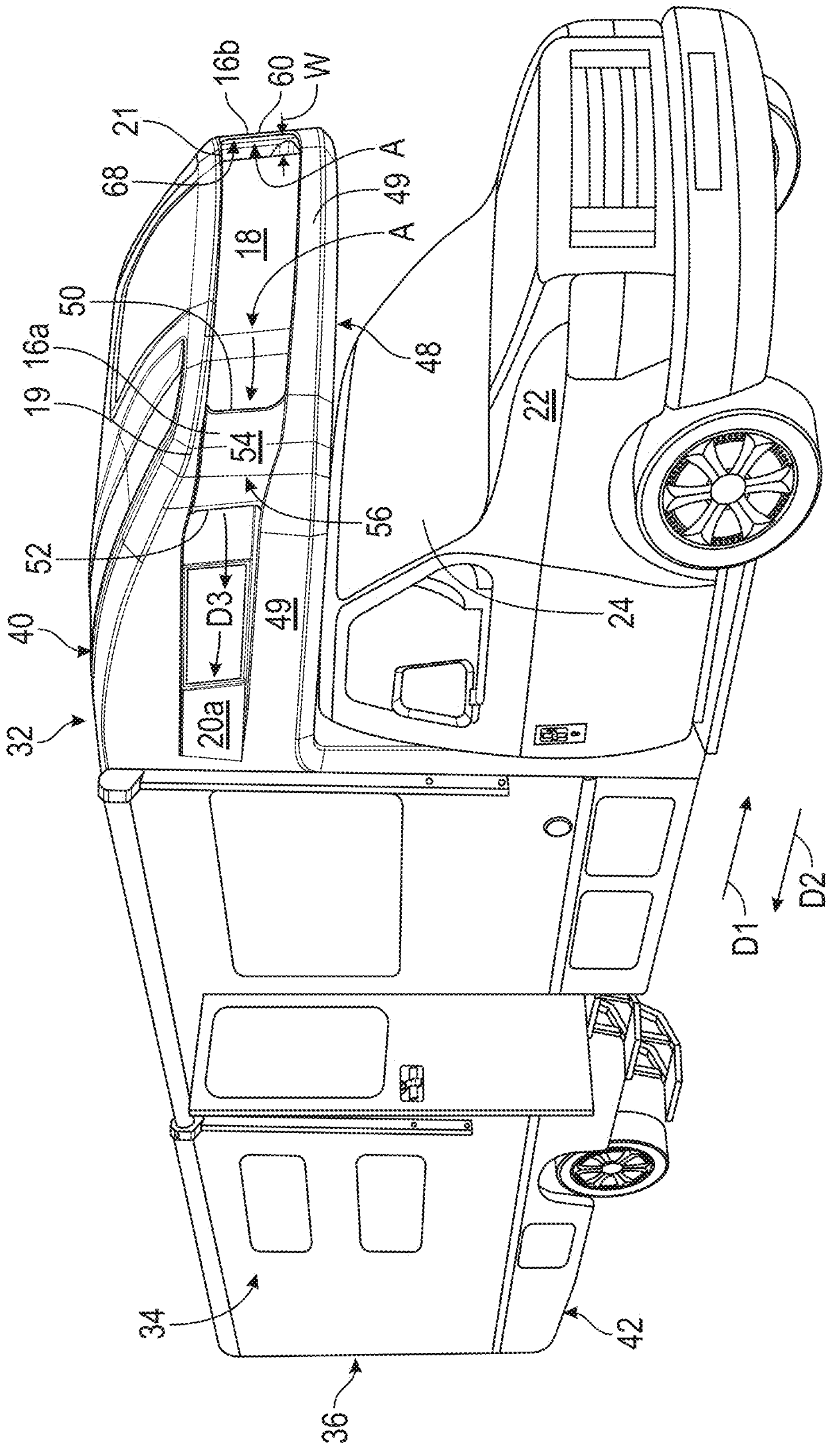
FIG. 10 is a schematic perspective view of an alternate embodiment of the shelter structure having a cabover portion disposed as part of a motorcoach.

The shelter structure 10 having a cabover portion 12 may be coupled to or integral to a variety of vehicles 14 that may comprise a vehicle propulsion system 22 and a vehicle cockpit 24. In one example embodiment, as shown in FIGS. 1, 1A 3-7, and 11, the vehicle 14 may be a passenger pick-up truck having an engine as the vehicle propulsion system 22 and a passenger cabin as the vehicle cockpit 24. The shelter structure 10 may be integral to the pick-up truck (FIGS. 1, 1A, and 3-7) or embodied as a removable truck top camper disposed in a cargo bed 26 of the pick-up truck (FIG. 11) and mounted to the truck bed via a mounting system. In another embodiment, the shelter structure 10 having a cabover portion 12 may be disposed as part of a recreational vehicle 14 such as a motorcoach (FIG. 10). In still another embodiment, the shelter structure 10 having a cabover portion 12 may be disposed as part of a heavy-duty truck tractor as the vehicle 14, wherein the vehicle propulsion system 22 is an engine and a steering axle, and the shelter structure 10 comprises a single unitary portion that includes the vehicle cockpit 24 that is disposed above the vehicle propulsion system 22.

Referring to FIGS. 1-9, the shelter structure 10 having a cabover portion 12 may be coupled to a vehicle 14 (pick-up truck) comprising a vehicle propulsion system 22 (engine) and a vehicle cockpit 24 (passenger cabin). The shelter structure 10 may comprise a unit body 30. The unit body 30 may be defined by a roof line 32, a contact surface 18, a rear facing surface 36, and two lateral sides 20*a*, 20*b*. The roof line 32, contact surface 18, rear facing surface 36, and two lateral sides 20*a*, 20*b* collectively define a first portion 34 and a second portion 40 of the body 30.

The first portion 34 of the body 30 extends from the rear facing surface 36 to the second portion 40 laterally between the lateral sides 20*a*, 20*b*. The first portion 34 further defines a first portion bottom edge 42, such that the first portion 34 extends vertically between the roof line 32 and the first portion bottom edge 42.

Figure 11:
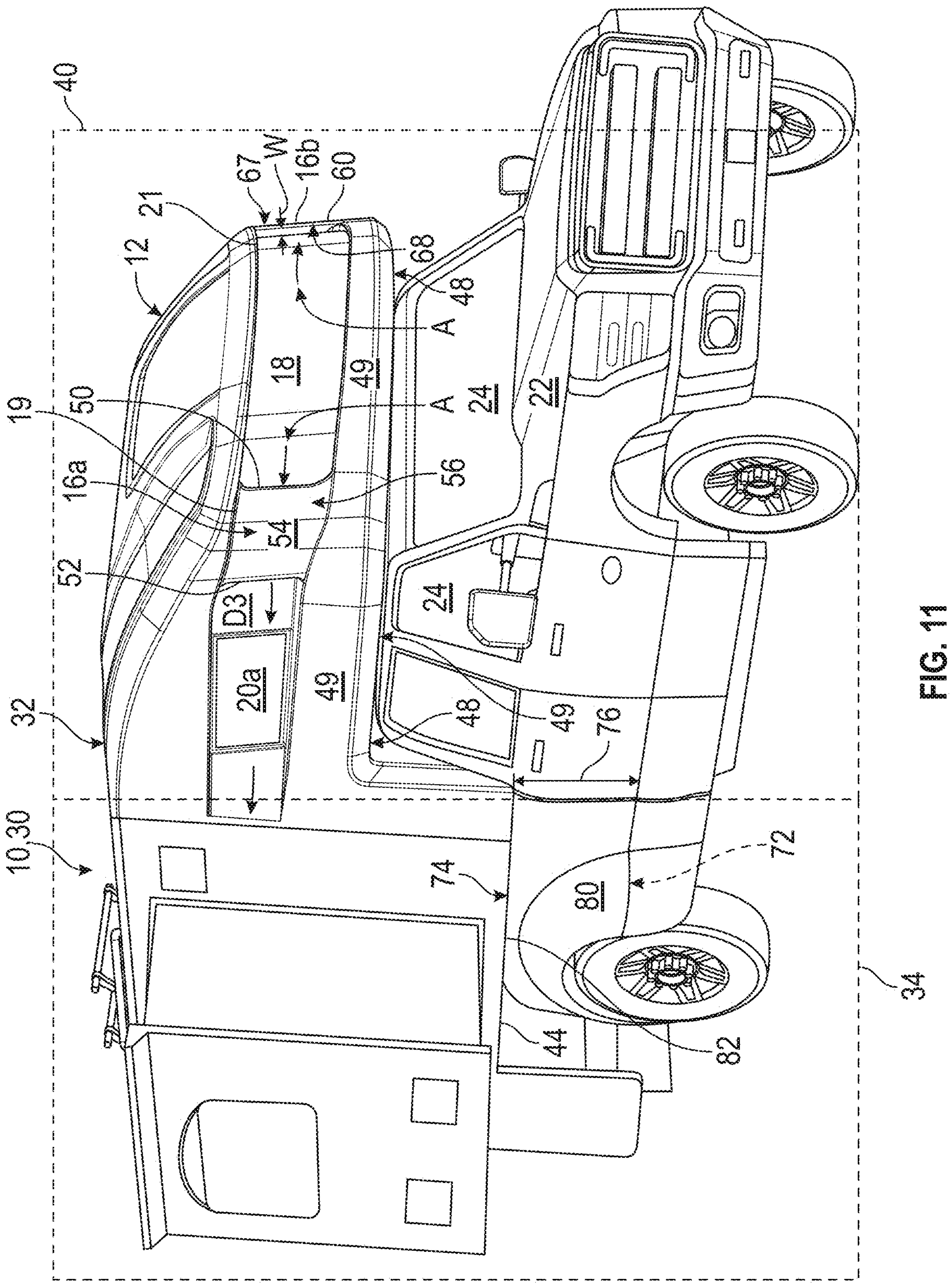
FIG. 11 is a schematic perspective view of another alternate embodiment of cabover truck top unit embodied as a shelter structure having a cabover portion disposed in a pick-up truck bed.

Referring specifically to FIG. 11, in an embodiment wherein the shelter structure 10 is embodied as a removable truck top camper (FIG. 11) disposed in a cargo bed 26 of the vehicle 14 (pick-up truck), the vehicle 14 may further comprise a cargo bed floor 72, a cargo bed top 74 disposed apart from the cargo bed floor 72 by a height 76, and two opposing cargo bed sides 80 that extend between the cargo bed floor 72 and the cargo bed top 76 defining two opposing ledges 82 at the cargo bed top 72 along each bed side 80. In such an embodiment, the first portion bottom edge 42 may further define two side portions 44 and a central portion 46. The two side portions 44 are disposed upon and in contact with the ledges 82, and the central portion 46 is disposed upon and in contact with the cargo bed floor 72.

The second portion 40 of the body 30 may comprise the cabover portion 12 disposed above the vehicle cockpit 24. As such, the second portion 40 extends from the first portion 38 to the contact surface 18 laterally between the lateral sides 20*a*, 20*b*. The second portion 40 may further define a second portion bottom section 49 that contains a second portion bottom edge 48, such that the second portion 40 extends vertically between the roof line 32 and the second portion bottom edge 48. The second portion bottom edge 48 is disposed above and directly adjacent to a roof of the vehicle cockpit 24. The second portion 40 also defines the contact surface 18. The contact surface 18 extends between the roof line to the second portion bottom section 49.

The shelter structure 10 may further comprise at least one airfoil 16*a*, 16*b* disposed upon the second portion 40 of the body 30. More particularly, shelter structure 10 may further comprise at least one airfoil 16*a*, 16*b* disposed upon the contact surface 18 strategically placed in high air pressure zones that may form on the contact surface 18 of the cabover portion 12 during forward travel of the associated vehicle 14 at sufficient speed. Said another way, the airfoils 16*a*, 16*b* are strategically placed on the contact surface 18 in the front corners of the second portion 40, such that the airfoils improve aerodynamics by reducing the naturally occurring high pressure zones or points of contact on the contact surface 18 and redirecting airflow down the lateral sides 20*a*, 20*b* of the shelter structure 10, i.e., controlling drag induced vortices formed at the high pressure zones.

As best shown in FIGS. 1-4, the at least one airfoil 16*a*, 16*b* may comprise a first airfoil 16*a* and a second airfoil 16*b*. In such an embodiment, as the vehicle 14 moves in a first linear direction of travel D1, the first airfoil 16*a* and the second airfoil 16*b* redirect an airflow path A, that contacts the contact surface 18 in a second and opposite linear direction D2, along the respective lateral sides 20*a*, 20*b* in a second non-linear direction D3 thereby reducing an aerodynamic drag force on the contact surface 18 as the vehicle 14 moves at sufficient speed in direction D1.

The first airfoil 16*a* may have a first leading edge 50, a first trailing edge 52, and a first airfoil intermediate section 54. The first leading edge 50 may be advantageously disposed along the contact surface 18 at or near a first abutment 19 disposed between the contact surface 18 and the first lateral side 20*a*. The first trailing edge 52 may be advantageously disposed along the first lateral side 20*a* downstream in the airflow path A from the first leading edge 50. The first airfoil intermediate section 54 may extend laterally from the first leading edge 50 to the first trailing edge 52. The first airfoil 16*a* may further define a first airfoil exterior 56 and a first airfoil interior 58. The first airfoil exterior 56 is vertically flush with and extends from the roof line 32 to the second portion bottom section 49. The first airfoil interior 58 is disposed opposite the first airfoil exterior 56 and is radially spaced apart from the contact surface 18 by an airflow path width W. The airflow path width may be from about 0.5 inches to about 4.0 inches depending on the type of vehicle 14 and related application. More particularly, in one embodiment the airflow path width W is from about 1.0 inches to about 2.0 inches. The first airfoil interior 58 and first airfoil exterior 56 may be arcuate in configuration, such that each surface 56, 58 is cambered with respect to the contact surface 18.

Analogously, the second airfoil 16*b* may have a second leading edge 60, a second trailing edge 62, and a second airfoil intermediate section 64. The second leading edge 60 may be advantageously disposed along the contact surface 18 at or near a second abutment 21 disposed between the contact surface 18 and the second lateral side 20*b*. The second trailing edge 62 may be advantageously disposed along the second lateral side 20*b* downstream in the airflow path A from the second leading edge 60. The second airfoil intermediate section 64 may extend laterally from the second leading edge 60 to the second trailing edge 62. The second airfoil 16*b* may further define a second airfoil exterior 67 and a second airfoil interior 68. The second airfoil exterior 67 is vertically flush with and extends from the roof line 32 to the second portion bottom section 49. The second airfoil interior 68 is opposite the second airfoil exterior 67 and is radially spaced apart from the contact surface 18 by an airflow path width W. The airflow path width may be from about 0.5 inches to about 4.0 inches depending on the type of vehicle 14 and related application. More particularly, in one embodiment the airflow path width W is from about 1.0 inches to about 2.0 inches. The second airfoil interior 68 and second airfoil exterior 67 may be arcuate in configuration, such that each surface 67, 68 is cambered with respect to the contact surface 18.

The airfoils 16*a*, 16*b* thereby reduce high air pressure zones that may form on the contact surface 18 of the cabover portion 12 in the forward or leading portion of the vehicle 14 during forward travel of the associated vehicle 14 at sufficient speed. The airfoils 16*a*, 16*b* pull air away from the contact surface 18 of the cabover portion 12, splitting the same with the respective leading edge 50, 60 and redirecting the airflow path A in direction D2 from the portion of the contact surface 18 substantially orthogonal to the direction of travel D1 along the respective lateral sides 20*a*, 20*b* in a non-linear direction D3, in a non-turbulent manner. More particularly, the airfoils 16*a*, 16*b*, are positioned in a positive angle of attack, such that the leading edge 50, 60 splits the airflow path A as it contacts the respective leading edge 50, 60 such that air flow along the exterior 56, 67 of the respective airfoil 16*a*, 16*b* moves at a higher velocity than the airflow along the interior 58, 68 and through the airflow path width W, which thereby reduces the pressure on the exterior 56, 67 of the respective airfoil 16*a*, 16*b*, i.e., reduces the aerodynamic drag at the foil position, which results in improved vehicle 14 performance, drivability, and fuel economy.

The respective first airfoil 16*a* and second airfoil 16*b* may be optimized in configuration and placement based upon the underlying vehicle 14 dimensions and aerodynamics.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Benefits, other advantages, and solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claims.

What is claimed is:

1. A shelter structure coupled to a vehicle propulsion system comprising a vehicle cockpit having a roof, the shelter structure comprising:

a body having a contact surface, a first lateral side, and a second lateral side, wherein the contact surface extends between the first lateral side and the second lateral side, such that the contact surface meets the first lateral side at a first abutment and the contact surface meets the second lateral side at a second abutment;

a first airfoil having a first airfoil exterior, a first airfoil interior, a first leading edge, a first trailing edge, and a first airfoil intermediate section extending from the first leading edge to the first trailing edge, wherein the first leading edge is disposed along the contact surface proximate the first abutment and the first trailing edge is disposed along the first lateral side downstream from the first leading edge proximate the first abutment, and wherein the each of the first airfoil exterior and the first airfoil interior are cambered with respect to the contact surface;

a second airfoil having a second airfoil exterior, a second airfoil interior, a second leading edge, a second trailing edge, and a second airfoil intermediate section extending from the second leading edge to the second trailing edge, wherein the second leading edge is disposed along the contact surface proximate the second abutment and the second trailing edge is disposed on the second lateral side downstream from the second leading edge proximate the second abutment, and wherein the each of the second airfoil exterior and the second airfoil interior are cambered with respect to the contact surface; and wherein when the vehicle is propelled in a first direction air moves in a second direction along an airflow path and meets the contact surface, and wherein the first airfoil and the second airfoil redirect the airflow path from the contact surface along the respective lateral sides in a third direction thereby reducing an aerodynamic drag force on the contact surface.

2. The shelter structure of claim 1 wherein the second direction is substantially opposite of the first direction, and wherein the third direction is non-linear and different than the first direction and the second direction.

3. The shelter structure of claim 2 wherein the first airfoil interior is radially spaced apart from the contact surface by an airflow path width and the second airfoil interior is radially spaced apart from the contact surface by the airflow path width.

4. The shelter structure of claim 3 wherein the airflow path width is from about 0.5 inches to about 4.0 inches.

5. The shelter structure of claim 3 wherein the body further defines a rear facing surface and a roof line that extends from the contact surface to the rear facing surface, the body further comprising a first portion and a second portion, such that the first portion extends between the first and second lateral sides from the rear facing surface to the second portion.

6. The shelter structure of claim 5 wherein the second portion further defines a second portion bottom section having a second portion bottom edge that is disposed above and directly adjacent to the roof of the vehicle cockpit, and wherein the second portion extends from the first portion to the contact surface and is disposed laterally between the first and second lateral sides and disposed vertically between the roof line and a second portion bottom edge.

7. The shelter structure of claim 6 wherein the first airfoil exterior is vertically flush with and extends from the roof line to the second portion bottom section, and wherein the second airfoil exterior is vertically flush with and extends from the roof line to the second portion bottom section.

8. The shelter structure of claim 7 wherein the vehicle propulsion system is a pick-up truck.

9. The shelter structure of claim 8 wherein the shelter structure is integral to the pick-up truck.

10. The shelter structure of claim 9 wherein the first portion of the shelter structure disposed behind the vehicle cockpit and the second portion of the shelter structure extends above the vehicle cockpit, such that the second portion bottom edge is disposed directly adjacent to the roof of the vehicle cockpit.

11. The shelter structure of claim 8 wherein:

the pick-up truck comprises a cargo bed having a cargo bed floor, a cargo bed top radially spaced apart from the cargo bed floor by a height, and two opposing cargo bed sides that extend from the cargo bed floor to the cargo bed top;

the first portion of the shelter structure further defines a first portion bottom edge having two side portions and a central portion; and wherein the first portion of the shelter structure is removably mounted to the cargo bed, such that the two side portions of the first portion bottom edge are disposed upon and in contact with the two opposing cargo bed sides and the central portion of the first portion bottom edge is disposed upon and in contact with the cargo bed floor.

12. The shelter structure of claim 11 wherein the second portion of the shelter structure extends above the vehicle cockpit, such that the second portion bottom edge is disposed directly adjacent to the roof of the vehicle cockpit.

13. The shelter structure of claim 7 wherein the vehicle propulsion system is a motorcoach.

14. The shelter structure of claim 13 wherein the first portion of the shelter structure disposed behind the vehicle cockpit and the second portion of the shelter structure extends above the vehicle cockpit, such that the second portion bottom edge is disposed directly adjacent to the roof of the vehicle cockpit.

15. A shelter structure coupled to a vehicle propulsion system comprising a vehicle cockpit having a roof, the shelter structure comprising:

a body having a rear facing surface, a contact surface, a first lateral side extending from the rear facing surface to the contact surface, and a second lateral side extending from the rear facing surface to the contact surface, wherein the contact surface extends between the first lateral side and the second lateral side, such that the contact surface meets the first lateral side at a first abutment and the contact surface meets the second lateral side at a second abutment;

a first airfoil having a first leading edge, a first trailing edge, and a first airfoil intermediate section extending from the first leading edge to the first trailing edge, wherein the first leading edge is disposed along the contact surface proximate the first abutment and the first trailing edge is disposed along the first lateral side downstream from the first leading edge proximate the first abutment, and wherein the first airfoil intermediate section defines a first airfoil interior and a first airfoil exterior that are each cambered with respect to the contact surface, such that the first airfoil interior is radially spaced apart from the contact surface by an airflow path width;

a second airfoil having a second leading edge, a second trailing edge, and a second airfoil intermediate section extending from the second leading edge to the second trailing edge, wherein the second leading edge is disposed along the contact surface proximate the second abutment and the second trailing edge is disposed on the second lateral side downstream from the second leading edge proximate the second abutment, and wherein the second airfoil intermediate section defines a second airfoil interior and a second airfoil exterior that are each cambered with respect to the contact surface, such that the second airfoil interior is radially spaced apart from the contact surface by the airflow path width; and wherein when the vehicle is propelled in a first direction air moves in a second direction along an airflow path and meets the contact surface, and wherein the first airfoil and the second airfoil redirect the airflow path from the contact surface along the respective lateral sides, via one of the airflow path width and along the airfoil exterior in a third direction thereby reducing an aerodynamic drag force on the contact surface.

16. The shelter structure of claim 15 wherein the body further comprises a first portion and a second portion, such that the first portion extends between the first and second lateral sides from the rear facing surface to the second portion; and wherein the second portion extends from the first portion to the contact surface between the first and second lateral sides.

17. The shelter structure of claim 16 wherein the second portion further defines a second portion bottom section having a second portion bottom edge that is disposed above and directly adjacent to the roof of the vehicle cockpit, and wherein the first airfoil exterior is vertically flush with and extends from the roof line to the second portion bottom section; and wherein the second airfoil exterior is vertically flush with and extends from the roof line to the second portion bottom section.

18. The shelter structure of claim 17 wherein the airflow path width is from about 0.5 inches to about 4.0 inches.

19. The shelter structure of claim 18 wherein the second direction is substantially opposite of the first direction, and wherein the third direction is non-linear and different than the first direction and the second direction.

* * * * *